SEARCH ROOM

BEST AVAILABLE COPY

Nov. 21, 1950 W. H. HOPPER ET AL Re. 23,294

VEHICLE WASHER Orig. 2465,562

Original Filed Dec. 2, 1946 2 Sheets-Sheet 1

INVENTORS,
William H. Hopper and
Virgil R. Drake
BY
Henry Molz
ATTORNEY.

SEARCH ROOM
Nov. 21, 1950 W. H. HOPPER ET AL Re. 23,294
VEHICLE WASHER
Original Filed Dec. 2, 1946 2 Sheets-Sheet 2
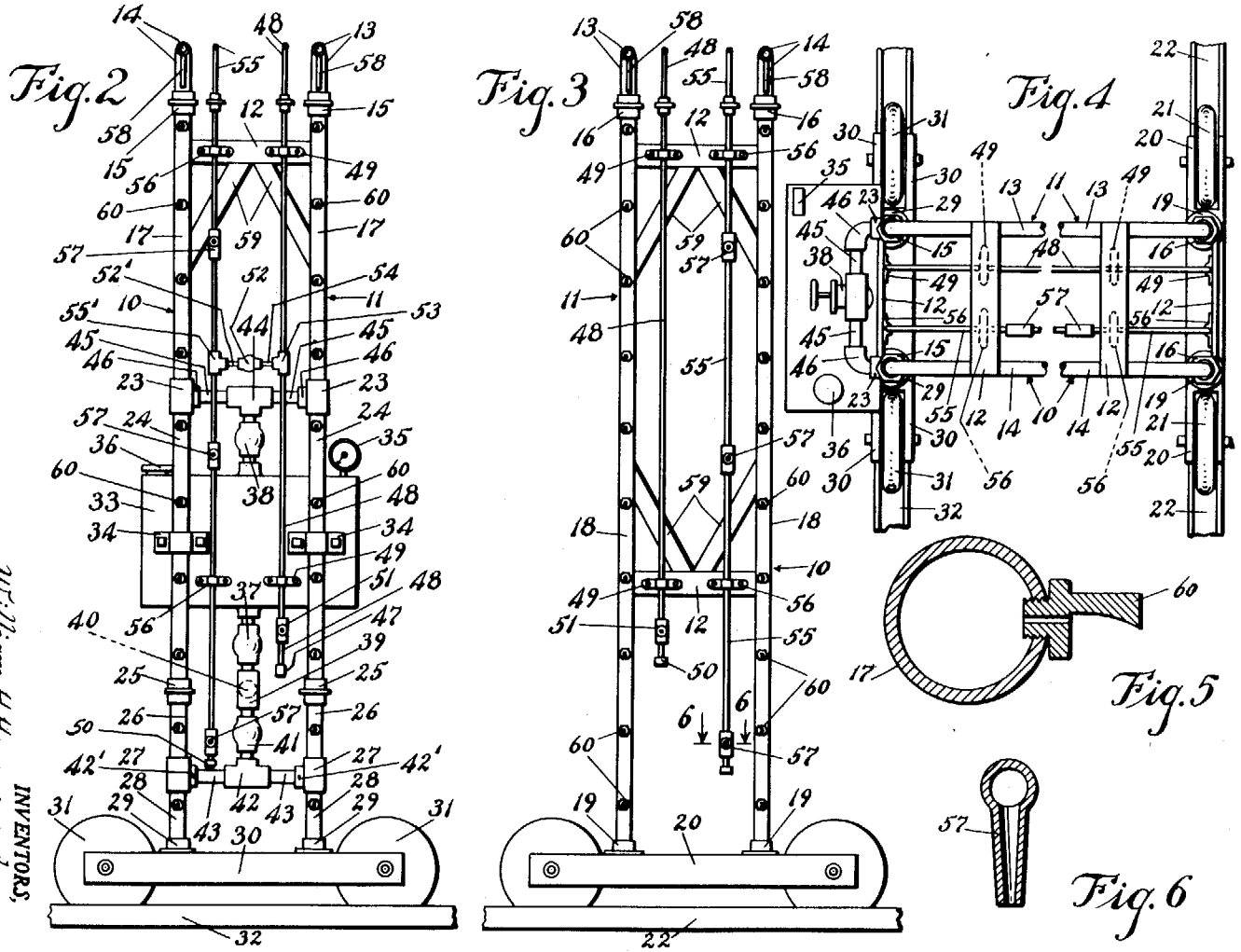
INVENTORS,
William H. Hopper and
Virgil R. Drake
BY
Henry Moltz
ATTORNEY.

SEARCH ROOM

Reissued Nov. 21, 1950

Re. 23,294

UNITED STATES PATENT OFFICE 23,294

VEHICLE WASHER

William Howard Hopper, Edison, and Virgil R. Drake, Los Angeles, Calif., assignors, by direct and mesne assignments, to Washmobile Corporation, a corporation of California Original No. 2,465,562, dated March 29, 1949, Serial No. 713,416, December 2, 1946. Application for reissue March 21, 1950, Serial No. 150,828

4 Claims. (Cl. 134—94)

Matter enclosed in heavy brackets [ ] appears in the original patent but forms no part of this reissue specification; matter printed in italics indicates the additions made by reissue

[The principal object of our invention is to provide a vehicle washer movable from vehicle to vehicle along the path of the vehicles in its movement thereover for the purpose of directing a plurality of cleaning sprays over the exposed or outer sides and top of the vehicle.]

[A further object of the herein invention is to provide a vehicle washer by means of which the exterior and interior of the vehicle may be thoroughly cleaned in a minimum amount of time and at a relatively low expense.]

[A further object of the herein invention is to provide a vehicle washer which will effectively remove road dirt and grime from a vehicle, an automobile. for example, and leave it clean and dry inside and outside.]

[A further object of the herein invention is to provide a vehicle washer which may readily be handled and controlled by one person.]

[And a stil further object is the provision of a vehicle washer portable in its structure, requiring but little space, and capable of accomplishing in a minimum of time and without physical effort on the part of the attendant, all that the largest auto laundries, for example, are able to accomplish.]

*The principal object of our invention is to provide a vehicle washer which may readily be handled and controlled by one person.*

*A further object is the provision of a vehicle washer portable in its structure, requiring but little space, and capable of accomplishing in a minimum of time and without physical effort on the part of the attendant, all that the largest auto laundries, for example, are able to accomplish.*

*A further object of the herein invention is to provide a vehicle washer by means of which the exterior and interior of the vehicle may be thoroughly cleaned in a minimum amount of time and at a relatively low expense.*

*And a still further object of the herein invention is to provide a vehicle washer which will effectively remove road dirt and grime from a vehicle, an automobile, for example, and leave it clean and dry both inside and outside.*

*In order to attain the above objects, the invention provides a generally rectangular archway under which the vehicle to be washed is stationed, said archway affording nozzles distributed over its height and width through which water and detergent solution may be emitted under pressure in appropriate sequence during the guided movement of the archway back and forth along the length of the vehicle.*

We attain these objectives by the vehicle washer shown in the accompanying drawings, in which:

Figure 2 is a vertical section on line 2—2 of Fig. 1;

Figure 3 is a vertical section on line 3—3 of Fig. 1;

Figure 4 is a plan view of the invention broken away to reduce the size of the figure;

Figure 5 is a section on line 5—5 of Fig. 1, and

Figure 6 is a section on line 6—6 of Fig. 3.

Similar numerals of reference throughout the several views indicate like parts.

Figure 1:
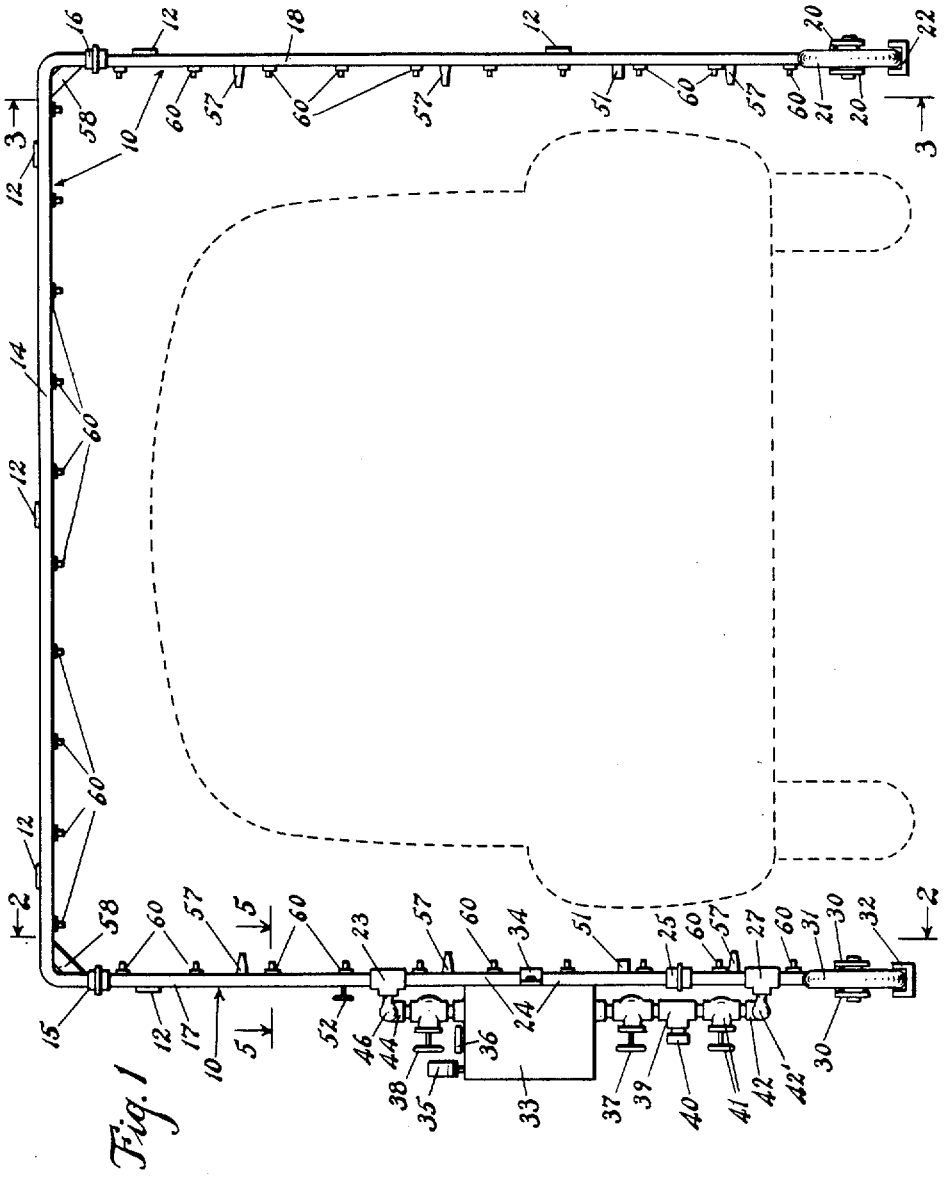
Figure 1 is an elevation of the vehicle washer with the outline of an automobile (used by way of example only) shown positioned therein by broken lines.

The invention is in general arch-like in shape so that it may be moved back and forth over a vehicle.

The arch structure includes a frame and in the form shown is largely formed of piping and fittings joined together to form a pair of parallel lines 10 and 11 held in spaced relationship by being welded to cross bars 12, 12.

Embodied in the pipe lines 10 and 11 are a pair of horizontal pipes 13 and 14 positioned across the top of the structure, the ends whereof are turned downwardly and joined as by means of unions 15, 15, and 16, 16, to vertical pipes 17, 17, and 18, 18, respectively at opposite sides of the structure.

*The pipe lines or conduits 10 and 11 are each of inverted U-shape and the vertical or upright conduits 17, 17, and 18, 18, are somewhat taller than a vehicle to be washed and the horizontal or connecting cross lengths 13 and 14 are somewhat longer than the width of the vehicle to be washed so that the arch structure formed by the pipe lines or conduits 10 and 11 is adapted to encompass the vehicle to be washed with the U-shaped pipe lines or conduits extending in substantially parallel relation and being spaced from each other by a distance but a small fraction of the length of the vehicle to be washed.*

The pipes 18, 18 are secured in vertical relation to the pipes 13 and 14 by means of flanges 19, 19 fixed as by welding to a truck frame 20 having a pair of wheels 21, 21, aligned to ride in a channel track 22, or otherwise within or without similar guide means as may be expedient and advantageous. *The truck frame 20, wheels 21 and track 22 extend at right angles to the general plane of the U-shaped frame formed by the pipe lines or conduits 10 and 11 and serve to limit the*

*movement of the frame crosswise of the vehicle to be washed and thereby guard against impact of the frame against such vehicle.*

The pipes 17, 17 are somewhat shorter in length than the pipes 18, 18. They extend downwardly into a pair of T's 23, 23, which also receive the upper ends of a pair of pipes 24, 24, the latter extending downwardly into a pair of unions 25, 25. They are so joined by means of a pair of nipples 26, 26 to a pair of T's 27, 27 which in turn are joined downwardly by a pair of nipples 28, 28, to a pair of flanges 29, 29.

The flanges 29, 29, are fixed in the identical manner as the flanges 19, 19 to another frame or truck bed 30 having a pair of wheels or rollers 31, 31 disposed in the channel track 32 which lies parallel to the track 22.

A tank 33 is suspended as shown upon the pipes 24, 24 by means of a pair of pipe hangers 34. Said tank, however, may be positioned elsewhere than shown, and unconnected to the washer proper as may be more convenient or desired. It is provided with a pressure gauge 35, a filler cap 36, an inlet valve 37 and an outlet valve 38.

The inlet valve 37 is disposed between the tank 33 and a T 39 coupled to a hose connection 40. Said T 39 is also coupled to a valve 41 which is mutually joined to the T's 27, 27 by a T 42, a pair of nipples 43, 43 and a pair of street elbows 42', 42'.

The outlet valve 38 is mutually joined to the T's 23, 23, by a T 44, a pair of nipples 45, 45, and a pair of street elbows 46, 46.

An air hose connection 47 is provided at the inlet end of an air pipe line 48 which is held parallel to the line 11 by pipe hangers 49, 49 fixed to the tank 33 and the bars 12, 12. Said line 48 is closed at its other end by a cap 50.

A pair of hose connecting fittings 51, 51 are provided in the line 48 at either side of the arched structure for purposes hereinafter explained.

A valve 52 is coupled into the line 48 by a T 53 and a nipple 54.

The valve 52 is also coupled into another air line 55 disposed parallel to the line 48 by a nipple 52' and a T 55', and which line is held by hangers 56, 56. The line 55 is closed at its lower end also by a cap 50.

A plurality of air blast nozzles 57, 57 are provided in the line 55.

Braces 58, 58 and 59, 59 may be welded to the lines 10 and 11 to stabilize the structure.

A plurality of water spray jets 60, 60 are provided in the lines 10 and 11.

In operation, the filler cap 39 is removed and the tank 33 is filled with a saponaceous agent to the desired quantity, the vehicle to be cleaned having been driven or otherwise moved into a position between the tracks 22 and 32 as seen in Fig. 1.

Water fed by means of a hose from the source of supply (not shown) and connected to the hose connection 40, valves 37 and 38 being closed, and valve 41 open will thus be sprayed upon the vehicle from the jets 60, 60 as the washer is moved along the tracks 22 and 32. Following this wetting of the vehicle, the valve 41 is closed and the valves 37 and 38 are opened, whereby the water will enter the tank 33 through the valve 37 and flow therefrom through the valve 38 into the lines 10 and 11, and therefrom through the jets 60, 60 to the vehicle.

As the water flows from the valve 37 into the tank 33, it contacts the saponaceous agent therein and is therewith thoroughly commingled. Thus when it flows out of the tank 33 through the valve 38, it is no longer clear water but a mixture comprising the cleansing agent. As it flows from the jets 60, 60, the washer is again moved along the tracks 22 and 32 in order to bring the jets 60, 60 in position with the vehicle for cleansing the same. Thereafter, the valves 37 and 38 are again closed and the valve 41 is again opened to permit the ejection of clear water to rinse off any saponaceous mixture adhering to the vehicle on further frame movement.

When the vehicle is thus cleaned and rinsed, the valve 41 is again closed so that no water (either clear or saponified) is sprayed upon the vehicle, and the valve 52 is opened to permit air from the line 48 to pass into the line 55 and exit through the nozzles 57, 57 to dry the vehicle.

An air hose connected to the source of supply (not shown) may be attached to the fittings 51, 51 to air clean the interior of the vehicle.

It will thus be seen that we have provided a unitary apparatus for mechanically washing an automotive vehicle by different controlled sequential washing operations during successive rolling movement of the apparatus along, over and within the length of the vehicle. These sequential operations are first rinsing with a clear water spray upon the first movement along and over the length of the vehicle, then by operation of the control valve cleansing by spraying water and a saponaceous mixture upon the next successive movement of the frame back along and over the length of the vehicle, then by further manipulation of the control valve a rinse of clear water spray during the next successive movement again along and over the vehicle, and then if desired by further manipulation of the air control, air drying of the vehicle upon further successive movement along and over the same. This results in a conservation of space and by the sequential different operations each of which is separately controlled upon successive movement of the frame back and forth along and over the vehicle completely rinses, cleans, rinses and dries the vehicle within its own length. As this entire unitary apparatus is adapted to be operated by a single operator the arrangement of the valved fluid control means in a zone of the frame accessible to the operator facilitates this operation.

We are aware that modifications may from time to time suggest themselves in the details of structure illustrated without departing, however, from the scope of our present invention, and as defined in the claims appended hereto. Hence, we do not limit our present invention to the exact description herein set forth, but what we do claim is:

1. A unitary apparatus for mechanically washing a stationary automotive vehicle by different controlled sequential washing operations during successive rolling movement along and within the length of the vehicle including a substantially U-shaped inverted light frame adapted to encompass a small area across the top and sides of the vehicle, rollers at the ends of the frame, floor tracks for the rollers to permit guided movement of the frame longitudinally of the vehicle in either direction, said frame including parallel spaced U-shaped pipe lines, spaced spray nozzles on said pipe lines directed toward the vehicle, a cleansing mixture containing tank on one leg of the frame, means to supply fluid under pressure to the movable frame, a valved fluid control means interposed between the supply and the pipe lines

SEARCH ROOM adjacent the tank adapted to be selectively operable at the termination of a rolling movement of the frame along the vehicle to direct fluid through the cleansing mixture tank or by-pass the same, and said valved control means being located and arranged in a zone of the frame accessible to an operator whereby upon successive back and forth movements of the frame along the vehicle and sequential selective fluid control the vehicle may be successively rinsed, cleansed and rinsed within its own length.

2. A unitary apparatus for mechanically washing a stationary automotive vehicle by different controlled sequential washing operations during successive rolling movement along and within the length of the vehicle including a substantially U-shaped inverted light frame adapted to encompass a small area across the top and sides of the vehicle, rollers at the ends of the frame, floor tracks for the rollers to permit guided movement of the frame longitudinally of the vehicle in either direction, said frame including parallel spaced U-shaped pipe lines, spaced spray nozzles on said pipe lines directed toward the vehicle, a cleansing mixture containing tank on one leg of the frame, means to supply water under pressure to said frame, a valved water control means interposed between the supply and pipe lines adjacent the tank adapted to be selectively operable at the termination of a rolling movement of the frame along the vehicle to direct water through the cleansing mixture tank or by-pass the same, means for supplying air under pressure to said frame, nozzle means for directing air against the vehicle, a valved air control means interposed between the air supply and nozzle, and all of said valved controls being located and arranged in a zone of the frame accessible to an operator whereby upon successive back and forth movements of the frame along the vehicle and sequential selective fluid control the vehicle may be rinsed, cleansed, rinsed and dried within its own length.

3. *A unitary apparatus for mechanically washing a stationary automotive vehicle by different controlled sequential operations, said apparatus comprising a pair of substantially identical pipe conduits each of inverted U-shape, each conduit including a pair of uprights somewhat taller than the vehicle to be washed and a connecting cross-length between the upper ends thereof somewhat longer than the width of the vehicle to be washed so that each of said conduits is adapted to encompass the vehicle to be washed, each of said conduits being closed at the lower ends of the uprights thereof, said U-shaped conduits extending in substantially parallel relation and being spaced from*

*each other by a distance but a small fraction of the length of the vehicle to be washed, means affixed to said two inverted U-shaped conduits intervening between and connecting the same to form a unitary inverted U-frame, horizontal carrier means directly and rigidly affixed to said inverted U-shaped conduits and bridging the corresponding extremities of the two inverted U-shaped conduits and constituting the sole support thereof, separate guide means for said U-frame extending at right angles to the general plane thereof and serving to confine said supported frame for movement lengthwise of the vehicle to be washed and thereby guarding against impact of the frame against such vehicle, each of said inverted U-shaped pipe conduits having nozzle openings distributed along the length thereof and directed inward to cause any emitted liquid to impinge upon the vehicle being washed in a narrow zone adjacent a plane transverse to the path of movement of the conduit, an inlet connected to at least one of said pipe conduits for supply of water therethrough, a second inlet connected to at least one of said pipe conduits for supply of detergent solution therethrough, and a valve control means for selectively feeding water or detergent solution.*

4. *The combination recited in claim 3 in which the support for the inverted U-shaped frame comprises a truck frame to which the lower ends of the U-shaped frame are rigidly fixed, said truck frame having wheels and said guide means comprises a pair of tracks for the wheels.*

WILLIAM HOWARD HOPPER.
VIRGIL R. DRAKE.

REFERENCES CITED

The following references are of record in the file of this patent or the original patent:

UNITED STATES PATENTS

| Number | Name | Date |
|---|---|---|
| 883,132 | Goff | Mar. 24, 1908 |
| 894,919 | Turner | Aug. 4, 1908 |
| 1,183,391 | Mason | May 16, 1916 |
| 1,508,495 | Bacharach | Sept. 16, 1924 |
| 1,897,821 | Poli | Feb. 14, 1933 |
| 1,997,849 | Bargar | Apr. 16, 1935 |
| 2,143,165 | Olson | Jan. 10, 1939 |
| 2,221,876 | Mackin | Nov. 19, 1940 |
| 2,253,609 | Byron et al. | Aug. 26, 1941 |
| 2,390,017 | Walsh | Nov. 27, 1945 |
| 2,489,445 | Benzuly | Nov. 29, 1949 |

FOREIGN PATENTS

| Number | Country | Date |
|---|---|---|
| 274,546 | Great Britain | July 15, 1927 |